United States Patent
Guduru

(10) Patent No.: US 11,225,363 B2
(45) Date of Patent: Jan. 18, 2022

(54) WATER PURIFICATION CAP

(71) Applicant: Microlyses, LLC, Brooklyn, NY (US)

(72) Inventor: Rakesh Guduru, Weston, FL (US)

(73) Assignee: Microlyses, LLC, Brooklyn, NY (US)

(*) Notice: Subject to any disclaimer, the term of this patent is extended or adjusted under 35 U.S.C. 154(b) by 55 days.

(21) Appl. No.: 16/745,774

(22) Filed: Jan. 17, 2020

(65) Prior Publication Data

US 2020/0270034 A1 Aug. 27, 2020

Related U.S. Application Data

(63) Continuation-in-part of application No. 29/705,353, filed on Sep. 11, 2019, now Pat. No. Des. 906,805,
(Continued)

(51) Int. Cl.
*C02F 1/32* (2006.01)
*B65D 51/24* (2006.01)

(52) U.S. Cl.
CPC ............ *B65D 51/24* (2013.01); *C02F 1/32* (2013.01); *C02F 2201/009* (2013.01);
(Continued)

(58) Field of Classification Search
CPC .... C02F 1/002; C02F 1/32; C02F 1/72; C02F 1/48; B65D 51/24; Y02A 20/212
See application file for complete search history.

(56) References Cited

U.S. PATENT DOCUMENTS 2,139,961 A 12/1938 Kleid
D153,956 S 5/1949 Lay
(Continued)

FOREIGN PATENT DOCUMENTS

CN 3363924 4/2004
CN 201958072 9/2011
(Continued)

OTHER PUBLICATIONS

"CrazyCap—A Bottle Cap Emits UVC LED Light-Ray to Eliminate Bacteria and Viruses from Your Bottle," http://www.tuvie.com/crazycap-a-bottle-cap-emits-uvc-led-light-ray-to-eliminate-bacteria-and-viruses-from-your-bottle/, Retrieved on Nov. 18, 2019.
(Continued)

*Primary Examiner* — Walter D. Griffin
*Assistant Examiner* — Cameron J Allen
(74) *Attorney, Agent, or Firm* — Frost Brown Todd LLC

(57) ABSTRACT

A water purification cap for covering a water bottle is provided. The cap may include a barrel and a shell. The shell may surround a first end of the barrel. The cap may include a charging site. The charging site may be integral to the shell. The charging site may include a positive pole, a negative pole and an RGB ring. The RGB ring may insulate between the positive pole and the negative pole. The RGB ring may display colors that indicate a status of the cap. The cap may include a UV-C LED. The UV-C LED may be proximal to a second end of the barrel. The light emitted from the UV-C LED may be UV-C rays. The UV-C rays may be in the range of 100-280 nanometers. The cap may include a touch sensor. When touched, the touch sensor may activate the UV-C LED.

22 Claims, 12 Drawing Sheets

Related U.S. Application Data which is a continuation of application No. 29/680,920, filed on Feb. 21, 2019, now Pat. No. Des. 899,926.

(60) Provisional application No. 62/828,199, filed on Apr. 2, 2019.

(52) U.S. Cl.
CPC ............... *C02F 2201/3221* (2013.01); *C02F 2201/3222* (2013.01); *C02F 2307/02* (2013.01)

(56) References Cited

U.S. PATENT DOCUMENTS

| | | |
|---|---|---|
| D179,331 S | 11/1956 | Terwilliger |
| D240,716 S | 7/1976 | Hegi |
| D286,027 S | 10/1986 | Waher et al. |
| D292,673 S | 11/1987 | Woodruff et al. |
| D292,674 S | 11/1987 | Morris et al. |
| D310,329 S | 9/1990 | Schmidt |
| D359,683 S | 6/1995 | Beach |
| D444,065 S | 6/2001 | Crawford et al. |
| D444,383 S | 7/2001 | Crawford et al. |
| D444,384 S | 7/2001 | Crawford et al. |
| D449,783 S | 10/2001 | Crawford et al. |
| D479,995 S | 9/2003 | Duceppe |
| D481,313 S | 10/2003 | Archer |
| D481,801 S | 11/2003 | Whitley |
| D490,315 S | 5/2004 | Kiser |
| D507,744 S | 7/2005 | Hierzer et al. |
| D516,911 S | 3/2006 | Bloom et al. |
| D518,717 S | 4/2006 | German |
| D519,029 S | 4/2006 | Hicks et al. |
| D522,862 S | 6/2006 | Owens et al. |
| D527,632 S | 9/2006 | Romer |
| D530,611 S | 10/2006 | Nusbaum et al. |
| D531,031 S | 10/2006 | Lussier et al. |
| D534,796 S | 1/2007 | Falkenburg |
| D534,802 S | 1/2007 | German |
| D536,966 S | 2/2007 | Cecere |
| D573,022 S | 7/2008 | Berman |
| D584,151 S | 1/2009 | Murphy |
| D617,427 S | 6/2010 | McNamara |
| D666,908 S | 9/2012 | Dabah et al. |
| D682,102 S | 5/2013 | Davis et al. |
| D692,605 S | 10/2013 | Madonia |
| D707,124 S | 6/2014 | Blain et al. |
| D708,945 S | 7/2014 | Jetmar |
| D717,648 S | 11/2014 | Firestone et al. |
| 8,975,596 B1 * | 3/2015 | Matthews ............... C02F 1/325 250/432 R |
| D729,063 S | 5/2015 | Koop et al. |
| D730,729 S | 6/2015 | George |
| 9,212,067 B2 | 12/2015 | Gellibolian et al. |
| D760,080 S | 6/2016 | Gorbold |
| D768,489 S | 10/2016 | Indruk |
| D796,326 S | 9/2017 | Ichikawa et al. |
| D804,306 S | 12/2017 | Simons et al. |
| D814,856 S | 4/2018 | Kristinik |
| D818,360 S | 5/2018 | Oates, II et al. |
| D825,334 S | 8/2018 | Ristich |
| D829,550 S | 10/2018 | Brahim et al. |
| D830,799 S | 10/2018 | Najera et al. |
| D850,189 S | 6/2019 | Burton |
| D853,183 S | 7/2019 | Adams, Jr. et al. |
| D858,284 S | 9/2019 | Murac et al. |
| D863,959 S | 10/2019 | Larminaux et al. |
| D866,461 S | 11/2019 | Arimoto et al. |
| D867,880 S | 11/2019 | Sacchetti |
| D871,133 S | 12/2019 | Bullock et al. |
| D875,524 S | 2/2020 | Holmes et al. |
| D878,915 S | 3/2020 | Parzych |
| 2011/0147335 A1 | 6/2011 | Garcia |
| 2015/0307368 A1 | 10/2015 | Yanke |
| 2019/0135660 A1 * | 5/2019 | Liao ..................... A61L 2/24 |
| 2020/0079658 A1 | 3/2020 | Weber et al. |

FOREIGN PATENT DOCUMENTS

| | | | |
|---|---|---|---|
| CN | 302727271 | | 1/2014 |
| CN | 203575874 U | * | 5/2014 |
| CN | 302968555 | | 10/2014 |
| EM | 000070271-0002 | | 2/2004 |
| JP | D1354222 | | 3/2009 |
| JP | D1470125 | | 5/2013 |
| JP | D1470126 | | 5/2013 |
| JP | D1502553 | | 7/2014 |
| JP | D1512556 | | 11/2017 |
| KR | 30-0967435 | | 8/2018 |
| KR | 30-0970565 | | 8/2018 |
| KR | 30-0996685 | | 3/2019 |
| WO | WO2013173953 | | 11/2013 |
| WO | WO2014187524 | | 11/2014 |

OTHER PUBLICATIONS

"LARQ Bottle," https://www.blessthisstuff.com/stuff/culture/drinks/larq-bottle/, Bless This Stuff Retrieved on Nov. 18, 2019.

Benjamin Burris, "UV—A Anti Microbe Bottle," https://benburris.myportfolio.com/uv-a-anti-microbe-bottle, Adobe Portfolio, Retrieved on Nov. 18, 2019.

"N-Hug-World's Smartest Self-cleaning Water Bottle," https://www.indiegogo.com/projects/n-hug-world-s-smartest-selfcleaning-water-bottle#/. Indiegogo, Inc., Jun. 3, 2019.

"Liz—The Smartest Self-Cleaning Bottle," https://www.indiegogo.com/projects/liz-the-smartest-self-cleaning-bottle#/, Indiegogo, Inc., Sep. 13, 2019.

"LED And UV Light Filtration Concept," https://www.samastles.com/light-filter, Samantha Astles, Retrieved on Nov. 18, 2019.

Dr. Rakesh Guduru, "CrazyCap—Portable Sterilization System Campaign." https://www.kickstarter.com/projects/1064892678/crazycap-portable-water-sterilization-system, Kickstarter, PBC, Jan. 17, 2019.

Dr. Rakesh Guduru, "CrazyCap—Portable Sterilization System Updates." https://www.kickstarter.com/projects/1064892678/crazycap-portable-water-sterilization-system/posts, Kickstarter, PBC, Jan. 17, 2019.

"Microlyscs Has a Better Alternative to Single-Use Plastic Water Bottles," https://www.newkerala.com/news/read/83249/microlyscs-has-a-better-alternative-to-single-use-plastic-water-bottles.html, Microlyscs LLC, Dec. 27, 2018.

Application No. EP20153685, European Search Report, dated Aug. 21, 2020.

"Microlyscs.com," Retrieved from Internet: URL https://web.archive.org/web/20190224040830/https://microlyscs.com/, Feb. 24, 2019.

Web Packaging. Auto-cleaning replacement cap for waterbottles. Feb. 20, 2019. https://www.webpackaging.com/en/portals/microlyscs/assets/12572243/auto-cleaning-replacement-cap-for-water-bottles/ (Year: 2019).

Boring Portal. Crazycap, A UV-Emitting Water Bottle Cap That Purify Water. Feb. 2, 2019. https://boringportal.com/crazycap-water-bottle/ (Year: 2019).

Gadgetify. CrazyCap UV-C Water Purifier Cap. Apr. 27, 2020. https://www.gadgetify.com/crazycap-uv-c-water-purifier-cap/ (Year: 2020).

"How Our Products Work," https://www.lifestraw.com/pages/how-our-products-work LifeStraw Water Filters & Purifiers, Retrieved on Mar. 2, 2020.

"LifeStraw Product Information Presentation," https://www.environfocus.com/lifestraw-nigeria/, Retrieved on Mar. 2, 2020.

* cited by examiner

WATER PURIFICATION CAP

CROSS-REFERENCE TO RELATED APPLICATION

This application is a nonprovisional of U.S. Provisional Patent Application No. 62/828,199, entitled "Sanitization cap for cola-style bottles," filed on Apr. 2, 2019, which is hereby incorporated by reference herein in its entirety. This application also claims priority from U.S. Design patent application No. 29/705,353, entitled "Bottle Cap with UV LED," filed on Sep. 11, 2019, which is a continuation of U.S. Design patent application No. 29/680,920, entitled "Bottle Cap," filed on Feb. 21, 2019, both of which are hereby incorporated by reference herein in their entireties.

FIELD OF TECHNOLOGY

This disclosure relates to water purification. Specifically, this disclosure relates to purifying water using ultra violet ("UV") light.

BACKGROUND OF THE DISCLOSURE

Microorganism-free, pathogen-free, virus-free and Bacteria-free water is a necessity for human life. Many times, in various different locations around the globe, clean, bacteria-free water is unavailable because of a variety of reasons.

Traditionally, this problem has been solved by single-use plastic water bottles. However, as a result, plastic waste from single-use plastic water bottles has grown exponentially. The plastic waste generated by disposed-of single-use plastic water bottles has generated a waste-management problem. Additionally, single-use plastic water bottles may be costly, especially in various locations around the globe.

Therefore, it is desirable to provide an apparatus for purifying water retrieved from bio-contaminated sources or sources of unknown contamination levels.

It is further desirable for the apparatus to operate together with typical reusable bottles.

It is yet further desirable for the apparatus to operate as a cap for typical reusable bottles.

SUMMARY OF THE DISCLOSURE

A water purification cap for covering a water bottle is provided. The water purification cap may include a barrel. The diameter of the barrel may be between 20-40 millimeters. The diameter of the barrel may be between 25-35 millimeters.

The water purification cap may include a shell. The shell may surround at least a portion of the barrel. The diameter of the shell may be between 30-50 millimeters. The diameter of the shell may be between 35-45 millimeters.

The gap between the outer diameter of the barrel and the inner diameter of the shell may be between 1 millimeter and 15 millimeters. The gap between the outer diameter of the barrel and the inner diameter of the shell may be, preferably between 3 millimeters and 10 millimeters.

The shell may include inner threads. The inner threads may enable the cap to screw onto a bottle. The bottle may be any suitable bottle, such as a reusable or non-reusable water bottle.

The water purification cap may include a charging site. The charging site may be integral to the shell—i.e., the shell may form the charging site. The charging site may charge a battery located within the cap.

It should be appreciated that the charging site may, in some embodiments, not include a charging port, or at least a readily discernable charging port. Examples of a readily discernable charging port may include a universal serial bus ("USB") port or micro-USB port. For the purposes of this application, port-less may be understood to mean no readily discernable location for the uptake of charging power.

It should be further appreciated that even though the charging site may be port-less, the charging site may utilize a wired connection. In these embodiments, the shell itself may include at least two areas that may conduct electricity. The two areas may be constructed of metal. The first area may be a positive area. The positive area may act a positive charging pole. The second area may be a negative, or ground, area. The negative area may act as a negative charging pole. The positive area and the negative area may be in the shape of rings, or concentric circles. The positive area and the negative area may be any suitable shape. An insulation area may insulate the positive area from the negative area. The insulation area may be in the shape of a ring. The insulation area may be constructed from an insulating material, such as plastic.

A charger may be used to charge the cap. The charge may be constructed to fit over the shell of the cap. The charger may include a charging terminal. The charging terminal may be built into the inner shell of the charger. The charging terminal may include positive and negative pins. The positive pin may be operable to contact the positive area on the cap. The negative pin may be operable to contact the negative area on the cap. When the charger is fit over the shell, the positive and negative pins may come in contact with the conductive material of the shell of the cap. Once in contact with the positive and negative areas on the cap, the positive and negative pins may charge the battery within the cap. It should be appreciated that the charger may be connected, using a wired connection, or a wireless connection, to a device that provides power. Such a device may include a laptop, electric outlet or any other suitable device.

In some embodiments, other suitable methods, such as wireless charging, may be utilized.

The water purification cap may also include a waterproof compartment. The waterproof compartment may be formed within the interior of the barrel. The waterproof compartment may protect the interior components that can be damaged when exposed to water. The waterproof compartment may include at least one wall. The at least one wall may be formed at least in part from quartz crystal. Quartz crystal may be a material that enables UV-C rays to go through it. Any suitable material that allows passage of UV-C rays may be utilized to form a portion of the at least one wall. Such a material may include flexible silicon material that enables the penetration of UV-C rays.

The water purification cap may also include a light emitting diode ("LED"). The LED may be an ultra-violet C ("UV-C") LED. A UV-C LED may be operable to produce UV-C rays. UV-C rays may include rays in the range of 100 to 280 nanometers ("nm"). UV-C rays may also include rays in the 260-280 nm range. The UV-C rays produced by the LED may preferably be about 278 nm.

It should be appreciated that, the UV-C rays may be produced, by the LED, without the use of toxic mercury. Toxic mercury may be harmful if ingested.

UV-C rays may penetrate liquids. UV-C rays may penetrate translucent, or partially-translucent liquids. UV-C rays may penetrate microbial cells included in liquids and/or translucent liquids. UV-C rays may destroy the active core (nucleic acids) of the microbial cells. The microbial cells may no longer be viable without the active core. After a period of time, the non-active microbial cells may revert to fundamental constituents, such as carbon dioxide ($CO_2$), and trace elements, such as N (Nitrogen), P (Phosphorus), O (Oxygen) and S (Sulfur).

In some embodiments, the cap may include a safety feature to prevent damage from UV-C rays. The safety feature may guard an unprotected eye or skin which may be damaged by UV-C rays. The safety feature may restrict the UV-C LED from being activated unless the cap is secured onto a bottle. The safety feature may include one, two or more pins included in an inner portion of the shell. The one, two or more pins may restrict the UV-C LED from activating unless the pins are depressed. The pins may not be depressed when the cap is detached from a bottle. The pins may be depressed when the cap is screwed onto, or otherwise in secured to a bottle.

The LED may be fixed within the waterproof compartment. The LED may be proximal to one end of the barrel. The LED may be oriented to shine light through the quartz crystal.

The cap may include a sensor. The sensor, when activated, may apply a voltage to the LED. Applying a voltage to the LED may cause the LED to emit light, such as UV-C light. The sensor may be a touch sensor. The sensor may be a button. The sensor may be any other suitable sensor.

In some embodiments, the barrel and/or any other component of the cap may be constructed from stainless steel.

In some embodiments, the barrel may be, in whole, or in part, constructed from plastic. When the UV-C rays are emitted from the LED, micro-cracks may form in the portion of the barrel that is exposed to the light. Therefore, a shield, which may be constructed from a metallic material, such as stainless-steel, may protect the portion of the barrel from being exposed to the UV-C rays. In this way, the barrel is not exposed to, and possibly damaged by, the UV-C rays.

As such, the cap may include a shield. The shield may be stainless-steel. The shield may be constructed from any suitable metallic material. The shield may be constructed from any other suitable material. The shield may be operable to shield the barrel from light generated by the LED.

Additionally, the construction of the cap may be a pressure-fit construction—i.e., the components within the cap may be pressure-fit to one another. For example, the shield may be pressure-fit to the barrel and the barrel may be pressure-fit to the shell. The pressure-fitting may be important because the construction may preferably not include glue. Glue may be undesirable because glue may degrade, and as the glue degrades, it may leach into the water included in the bottle.

In some embodiments, the shell and/or the barrel may include a digital display. The digital display may display data. The data may include the status of the UV-C LED—i.e., whether the UV-C LED is on, or how much battery power is left. The data may also include the status of the liquid in the bottle—i.e., whether the water has been sanitized. The data may also include the status of the charge of the battery included in the cap.

The cap may also include one or more gaskets. The one or more gaskets may be constructed from silicon or any other suitable material. The one or more gaskets may surround a portion of the barrel that is near the UV-C LED. The one or more gaskets may seal a bottle to which the water purification cap is secured. The one or more gaskets may provide a 360-degree seal, or complete seal of the contents of the bottle.

In some embodiments, the cap may include a total dissolved solids ("TDS") sensor. The TDS sensor may record the total dissolved solids of the contents of the bottle. The digital display may display the total dissolved solids.

The cap may also include a temperature probe. The temperature probe may record the temperature of the contents of the bottle. The digital display may display the recorded temperature. The digital display may also indicate a phase state indicator—e.g., the indicator may indicate the percentage of water and/or ice that is currently in the bottle.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
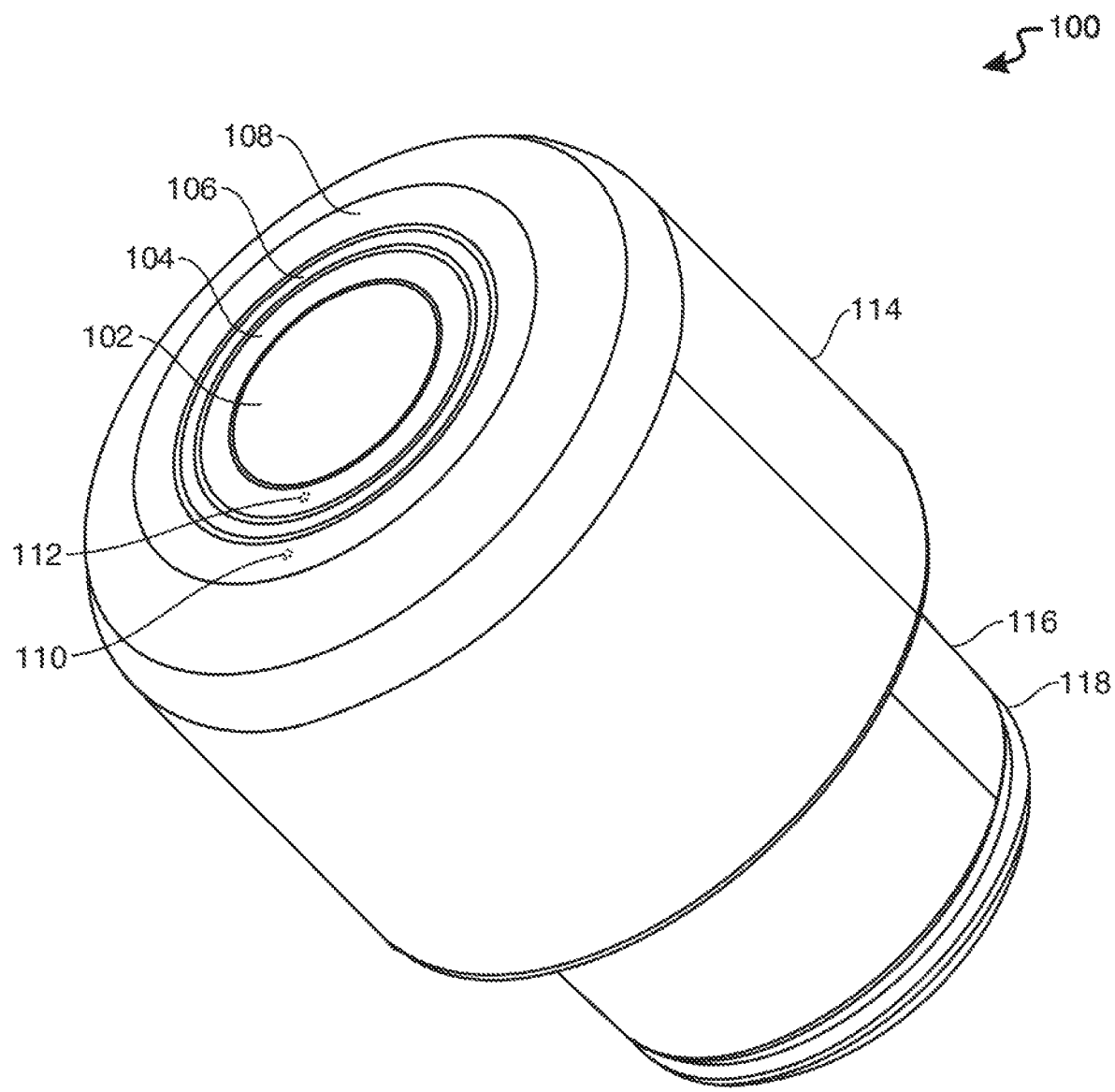
FIG. 1 shows an illustrative perspective top-down view of embodiments of the disclosure.

A water purification cap for covering a water bottle is provided. The cap may include a barrel. The cap may include a shell. The shell may surround a first end of the barrel.

The cap may include charging site. The charging site may be integral to the shell. The charging site may include a positive area, a negative (or ground) area and an insulation ring. The insulation ring may insulate between the positive area and the negative area.

The cap may include a UV-C LED. The UV-C LED may be proximal to the second end of the barrel. The UV-C LED may be oriented to shine light from the second end of the barrel. The light emitted from the LED may be ultraviolet light ranging between 100 and 400 nm. UV-C light may be short-wave UV rays in the range of 100-280 nanometers. In some embodiments, the light emitted from the UV-C LED may preferably be about 278 nm.

The cap may include a sensor. The sensor may be operable to activate the UV-C LED. The sensor may be a touch sensor. The sensor may be a button. The sensor may be any suitable sensor.

In some embodiments, the touch sensor may respond to a single touch, double touch or multi-touch. A single touch may initiate the display of the remaining battery charge. The insulation ring, as will be described below, may show the remaining battery charge. Such an insulation ring may be illuminated in different colors according to the level of charge remaining. Such an insulation ring may be illuminated by a ring shaped, or other, red green blue ("RGB") LED.

A double touch may initiate activation of the UV-C LED for a first predetermined period of time. The first predetermined period of time may be 30 seconds, 60 seconds, 90 seconds or any other suitable period of time. Exposure of the contents of the bottle to the UV-C LED rays for the first predetermined period of time may be suitable for destroying microbial cells found in liquids from mildly to moderately contaminated sources. Such mildly to moderately contaminated sources may include unfiltered tap water and water from fountains. Exposure of a UV-C LED to a 6-128-ounce bottle for the first predetermined time period may sterilize the contents of the bottle to 99.99%.

A multi-touch, such as a three, four, five, six or other suitable amount of touches may initiate activation of the UV-C LED for a second predetermined period of time. The second predetermined time period may be 90 seconds, 120 second, 150 seconds, 240 seconds, 360 seconds or any other suitable time period. Exposure of the contents of the bottle to the UV-C LED rays for the second predetermined period of time may be suitable for destroying microbial cells found in liquids from moderately to highly contaminated sources. Such moderately to highly contaminated sources may include water from lakes and ponds. Exposure of a UV-C LED to a 6-128-ounce bottle for the second predetermined time period may sterilize the contents of the bottle to 99.9999%.

In some embodiments, the insulation ring may be a red green blue ("RGB") ring. The RGB ring may illuminate in order to indicate a status of the cap. The RGB ring may illuminate various colors. Each of the colors may indicate a different status of the cap. In addition to the color of the illumination, the frequency of the illumination—e.g., whether the illumination is constant, quick-blinking or slow-blinking—may indicate various status levels of the cap.

For example, slow-blinking blue illumination may indicate that sterilization is in progress. Upon sterilization completion, a solid-green illumination may be shown.

Also, indication of 50%-100% of remaining battery charge may be displayed using a solid-green illumination. Indication of 25%-50% of remaining battery charge may be displayed using a solid-orange illumination. Indication of 0%-25% of remaining battery charge may be displayed using a solid-red illumination.

It should be appreciated that any suitable color display for any suitable status may be contemplated within the scope of the disclosure.

It should also be appreciated that the water purification cap may be used to sanitize or disinfect multiple surfaces, such as keyboards, laptops, computers, mice, jewelry, toothbrushes or any other suitable surfaces.

Apparatus described herein are illustrative. Apparatus in accordance with this disclosure will now be described in connection with the figures, which form a part hereof. The figures show illustrative features of apparatus in accordance with the principles of this disclosure. It is to be understood that other embodiments may be utilized and that structural, functional and procedural modifications may be made without departing from the scope and spirit of the present disclosure.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows a top-down perspective view of water purification cap 100. Water purification cap 100 may include shell 114 and barrel 116. A portion of barrel 116 may be covered by shell 114.

Water purification cap 100 may be constructed from metallic materials, glass materials, quartz crystal materials, silicon materials, plastic materials, any other suitable materials or a combination thereof. Most preferably, shell 114 may be constructed at least partially from stainless steel, and barrel 116 may be constructed at least partially from plastic.

Water purification cap 100 may include a charging site. The charging site may be integrated into shell 114. Pole 104 may be an area located on shell 114 that is configured to conduct electricity. Pole 104 may be constructed from a metallic, such as metal or stainless steel. Pole 104 may act as positive charging pole, or vice versa.

Pole 108 may be an area located on shell 114 that is configured to conduct electricity. Pole 108 may be constructed from a metallic, such as metal or stainless steel. Pole 108 may act as a negative charging pole, or vice versa.

Pole 104 and pole 108 may be opposite charging poles. As such, one pole may be negative and a second pole may be positive. The positive pole and the negative pole may be insulated from each other. Red green blue ("RGB") ring 106 may insulate between pole 104 and pole 108. RGB ring may separate the negative pole from the positive pole.

Exemplary contact point 112 may be an exemplary point on pole 104 that may come in contact with a charger, which will be described in further detail below. Exemplary contact point 110 may be an exemplary point on pole 108 that may come in contact with a charger, which will be described in further detail below. It should be appreciated that the contact points are exemplary, and that the charging pins, included in the charger, may come in contact with any location on pole 104 or pole 108.

RGB ring 106 may insulate between pole 104 and pole 108. RGB ring 106 may also illuminate various colors. RGB ring 106 may illuminate colors based on a status of the cap. Such a status may include ON status of the UV-C LED, battery charge status or any other suitable status, or combination of status levels.

Water purification cap 100 may also include sensor 102. Sensor 102 may be a touch sensor. The touch sensor may be sensitive to touch. The touch sensor may activate the UV-C LED or the illumination of the RGB ring in response to one or more taps.

Water purification cap 100 may also include gasket 118. Gasket 118 may be constructed from silicon or any other suitable material. Gasket 118 may seal a bottle to which the water purification cap is secured. Gasket 118 may provide a 360-degree seal, or complete seal of the contents of the bottle.

Figure 2:
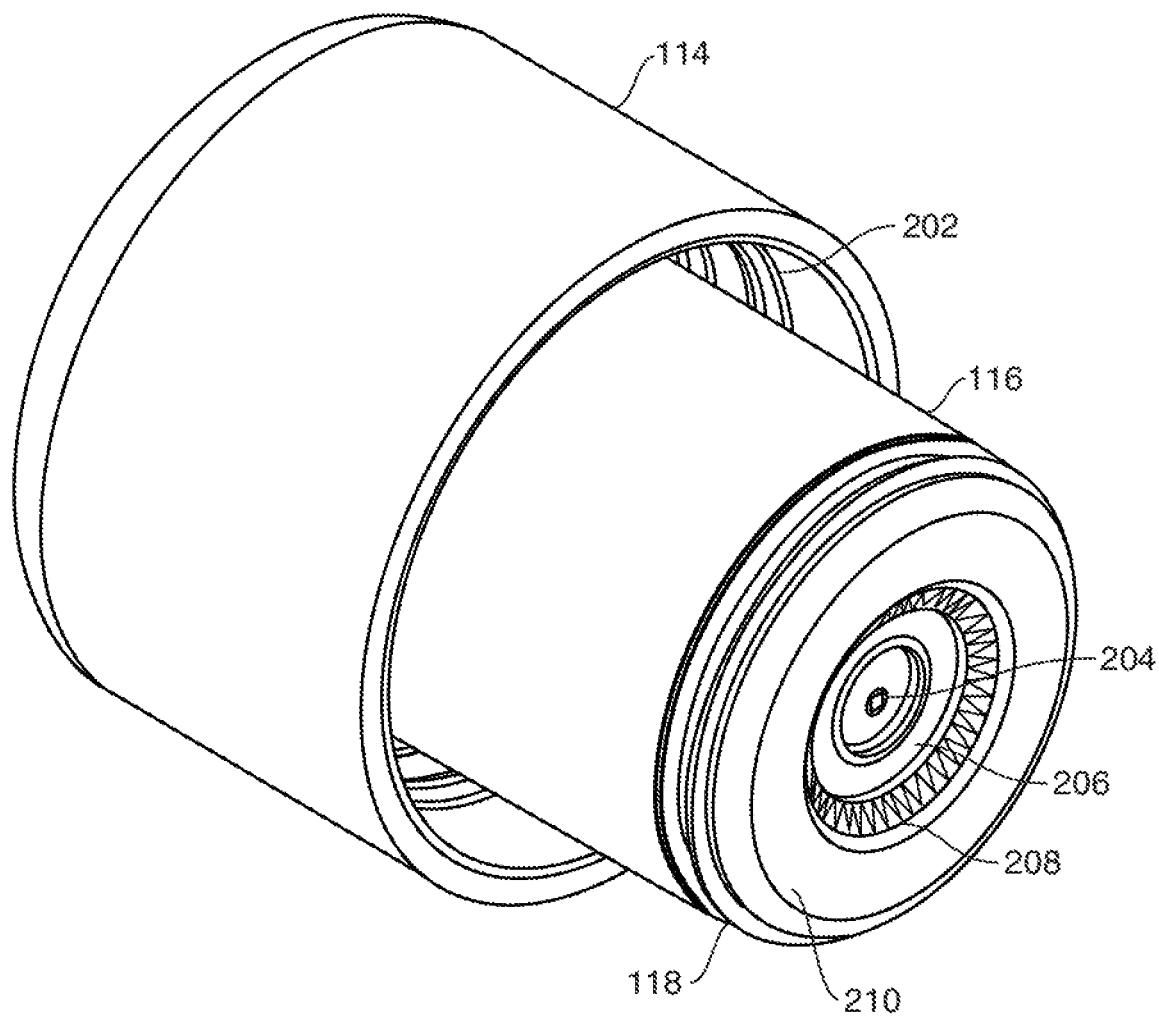
FIG. 2 shows an illustrative perspective bottom-up view of embodiments of the disclosure.

FIG. 2 shows an illustrative perspective bottom-up view of water purification cap 100. As shown, an inner portion of shell 114 may include inner threads 202. Inner threads 202 may enable water purification cap 100 to screw onto a conventional reusable water bottle.

UV-C LED 204 may be operable to shine UV-C LED rays when activated. UV-C LED 204 may be included in an inner, waterproof compartment of barrel 116. Quartz crystal 206 may maintain the waterproof properties of the inner compartment of barrel 116. Quartz crystal 206 may enable the UV-C LED rays to shine out from the compartment into a bottle (not shown).

Barrel 116 may include lower end of barrel 210. Lower end of barrel 210 may be near gasket 118. Lower end of barrel 210 may be primarily constructed from plastic material. It should be appreciated that rays from UV-C LED 204 may create micro-cracks in lower end of barrel 210. As such, shield 208, which may be constructed from a suitable metallic, such as stainless steel, or other suitable material, may protect lower end of barrel 210 from exposure to the rays from UV-C LED 204.

Figure 3A:
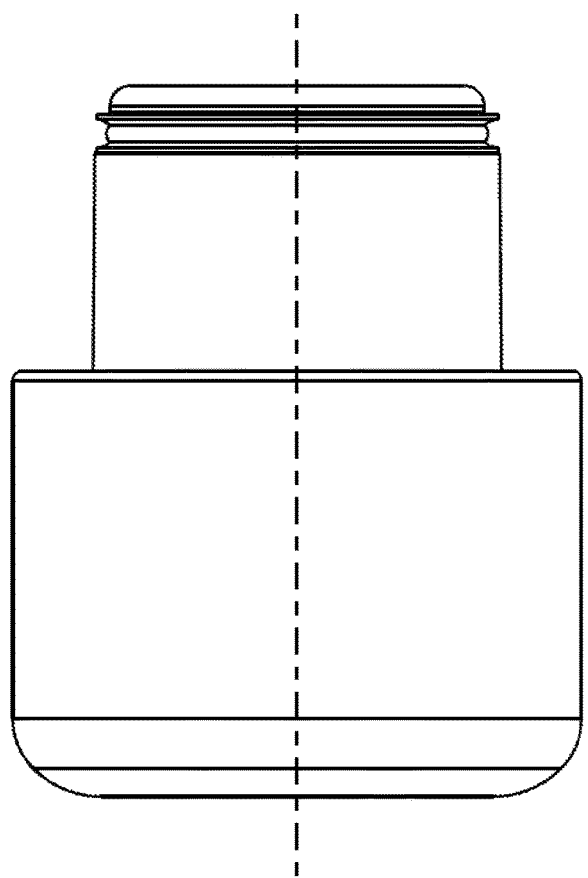
FIGS. 3A and 3B shows an illustrative cross-sectional view of embodiments of the disclosure.
Figure 3B:
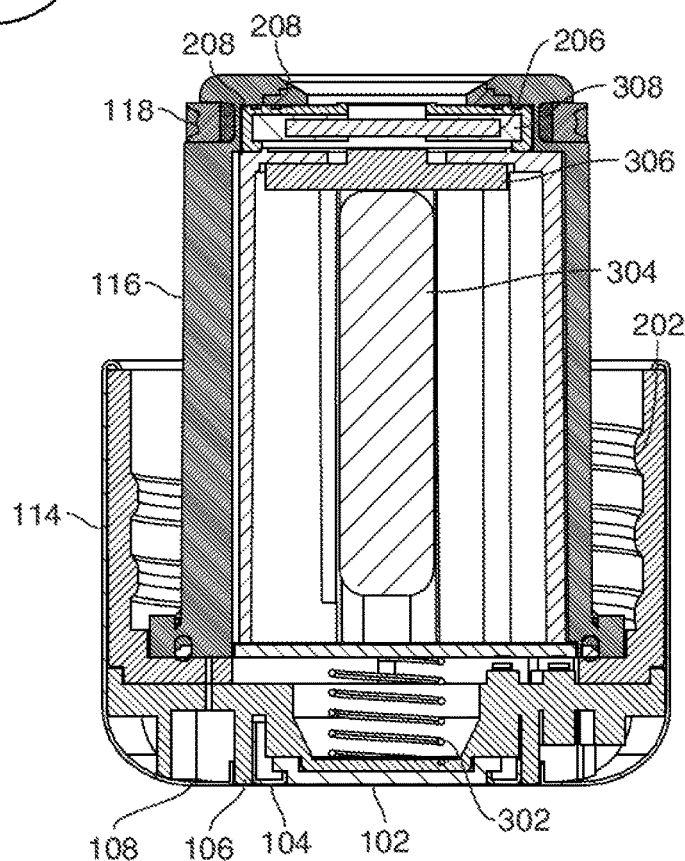

FIGS. 3A and 3B shows an illustrative cross-section of water purification cap 100. FIG. 3A shows the cross-section line. FIG. 3B shows the cross-sectional view.

The cross-sectional view shows touch sensor 102 activating internal components of water purification cap 100 using spring 302.

Quartz crystal 206 may be surrounded by silicon o-ring 308. Silicon o-ring 308 may ensure a pressure-fit and watertight-ness of quartz crystal 206 and other components included in the cap.

Shield 208 may be formed from one or more pieces (see FIG. 3B which shows shield 208 in two pieces).

UV-C LED 204 (not shown in the cross-section) may be mounted onto PCB-A 306. PCB-A 306 may be a printed circuit board assembly. PCB-A may stand for printed circuit board assembly. A PCB may be a printed circuit board that mechanically supports and electrically connects electrical or electronic components using conductive tracks, pads and other features etched from one or more sheet layers of copper laminated onto and/or between sheet layers of a non-conductive substrate.

Battery 304 may power one or more components included in cap 100. Such components may include PCB-A board 306.

Padding, or thermal insulation, may be included in between battery 304 and PCB-A board 306. UV-C LED 204 may generate heat. Therefore, PCB-A board 306 may become hot. As such, padding, or thermal insulation may protect battery 304 from being damaged by heat generated by UV-C LED 204. The padding, or thermal insulation may be constructed from Styrofoam™ or any other suitable insulating material.

Figure 4:
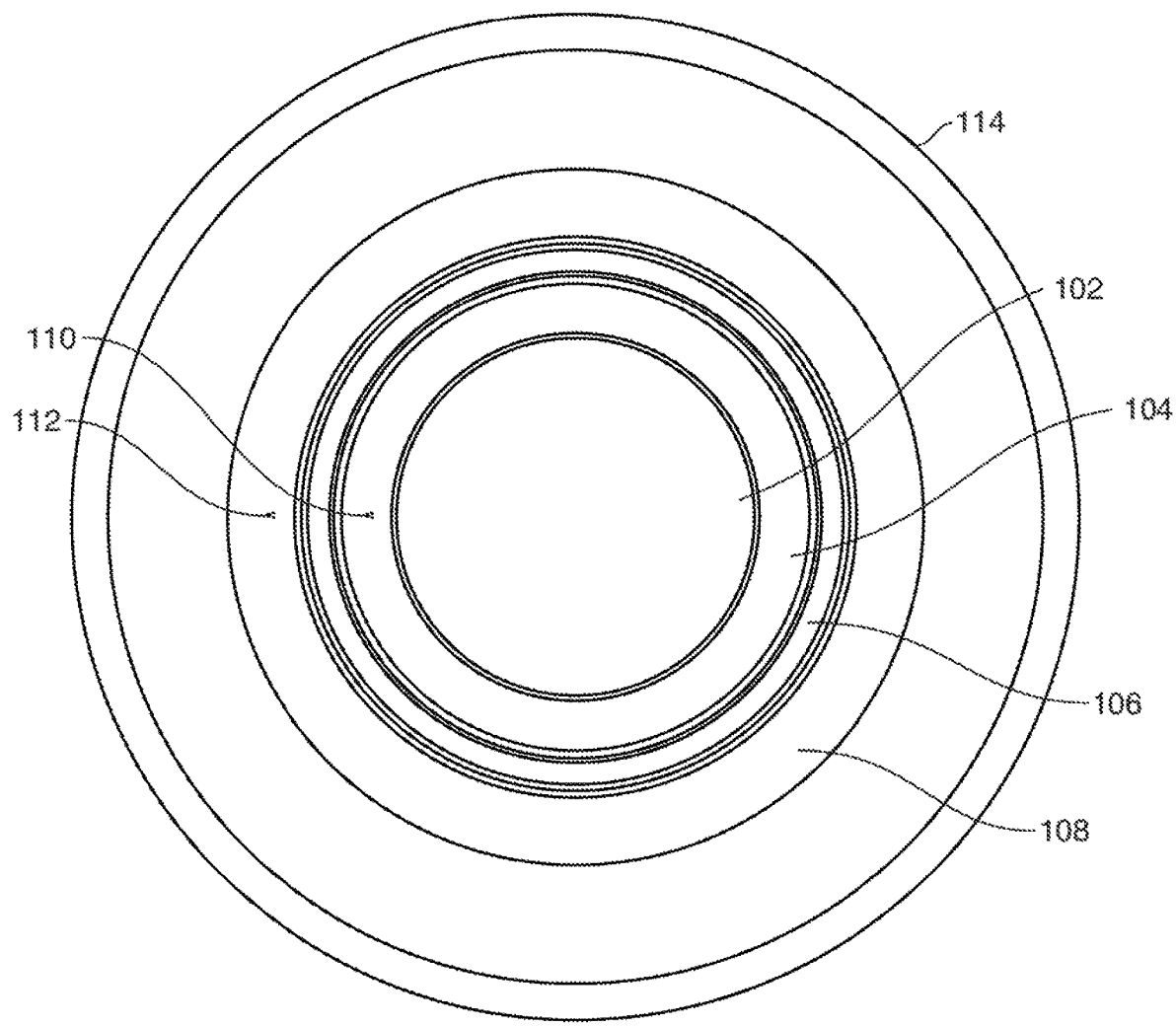
FIG. 4 shows an illustrative top view of embodiments of the disclosure.

FIG. 4 shows an illustrative top view of water purification cap 100.

Figure 5:
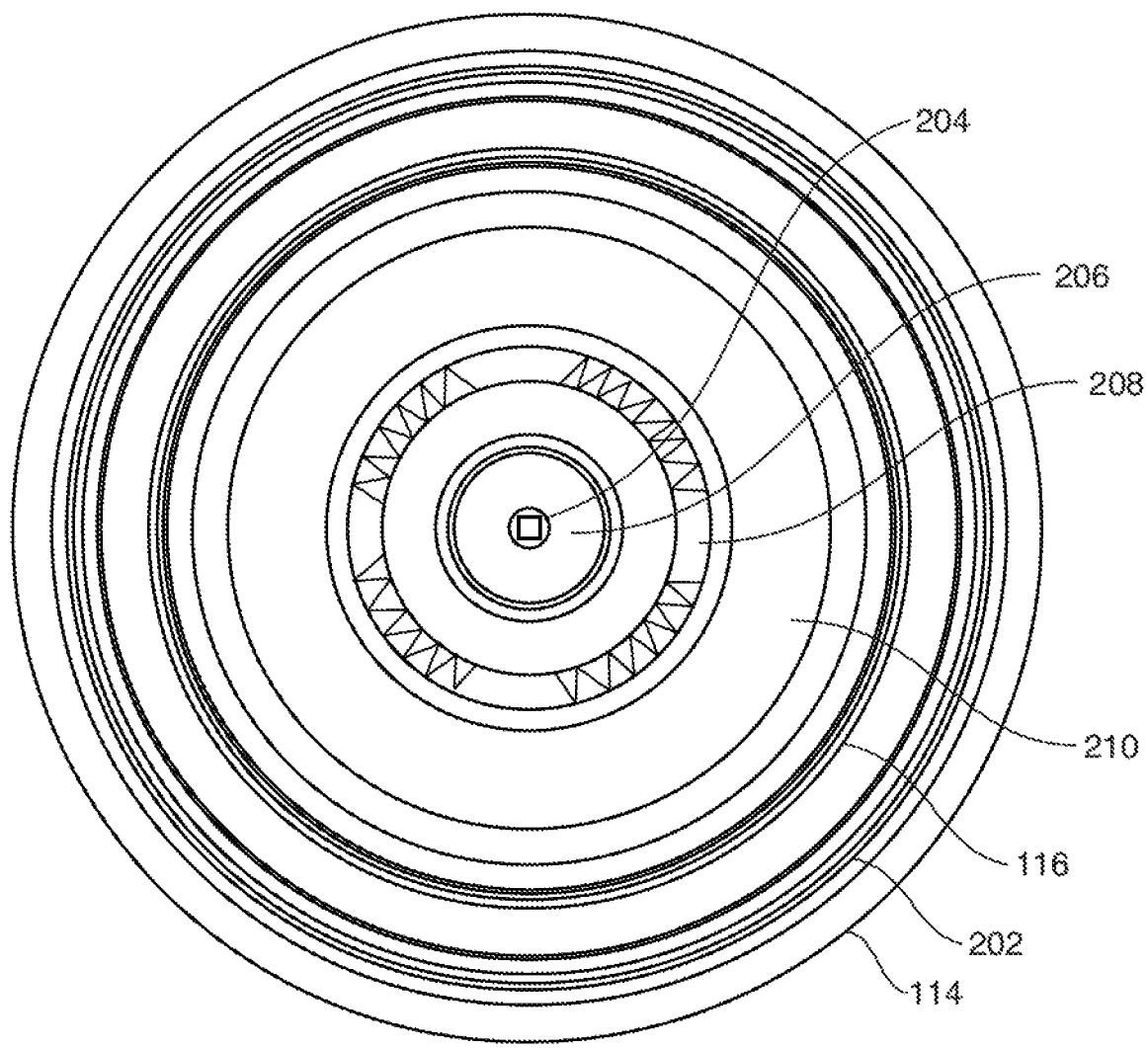
FIG. 5 shows an illustrative bottom view of embodiments of the disclosure.

FIG. 5 shows an illustrative bottom view of water purification cap 100.

Figure 6:
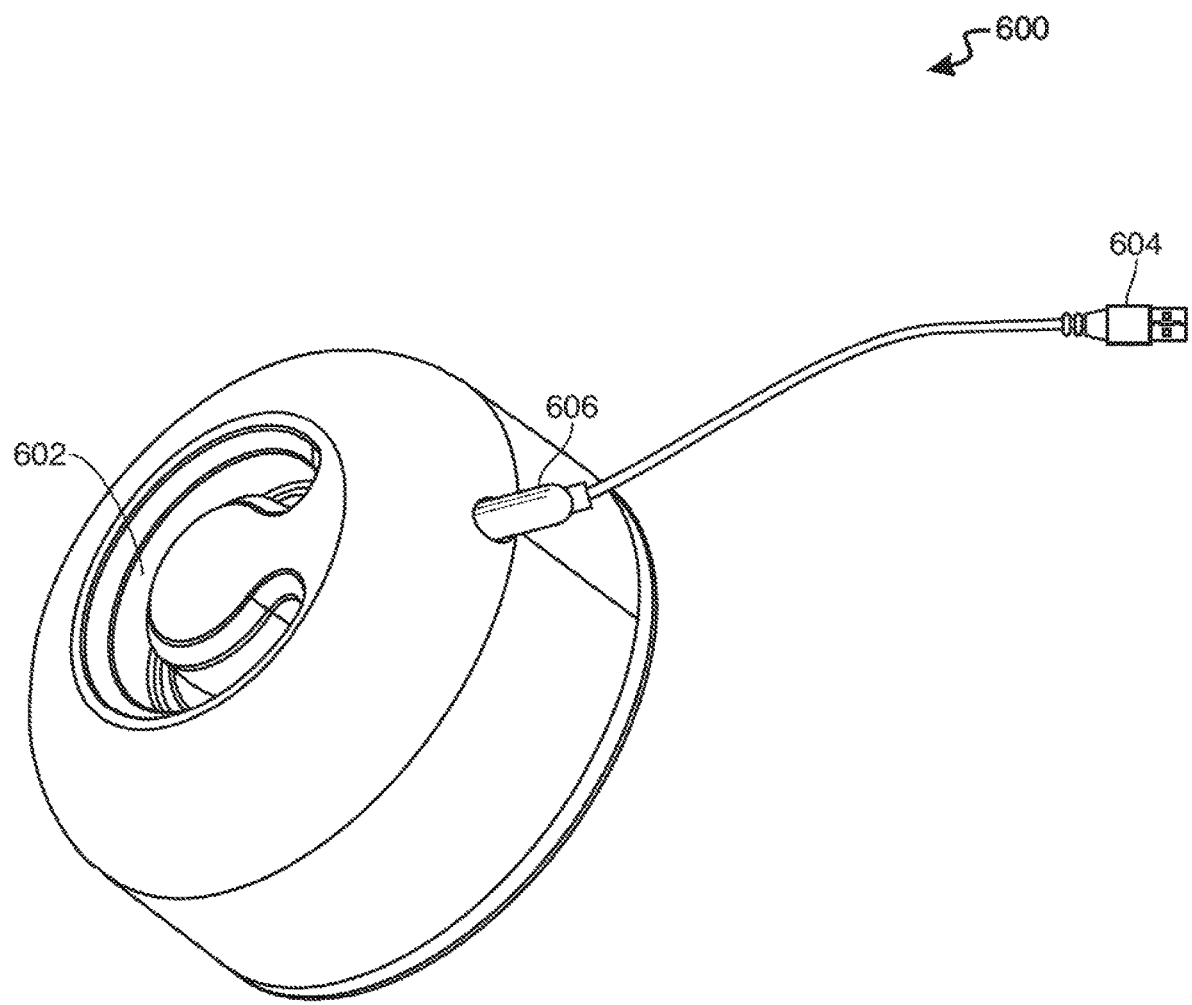
FIG. 6 shows an illustrative perspective view of embodiments of the disclosure.

FIG. 6 shows an illustrative perspective view of charging cover 600. Charging cover 600 may be operable to fit over shell 114 of water purification cap 100.

Charging cover 600 may include U-shaped hole 602. U-shaped hole 602 may enable a user to view RGB ring 106. RGB ring 106 may illuminate an orange color during the charging process. RGB ring 106 may illuminate a green color when the charging process has been completed. As such, U-shaped hole 602 may preferably enable the user to determine the status of the charge without removing water purification cap 100 from charging cover 600.

Charging cover 600 may also include connection 606. Connection 606 may connect cover 600 to connection port 604. Connection port 604 may be a USB port, micro-USB port or any other suitable port. Connection port 604 may connect to a computer, outlet or any other suitable device that provides electric power.

Figure 7:
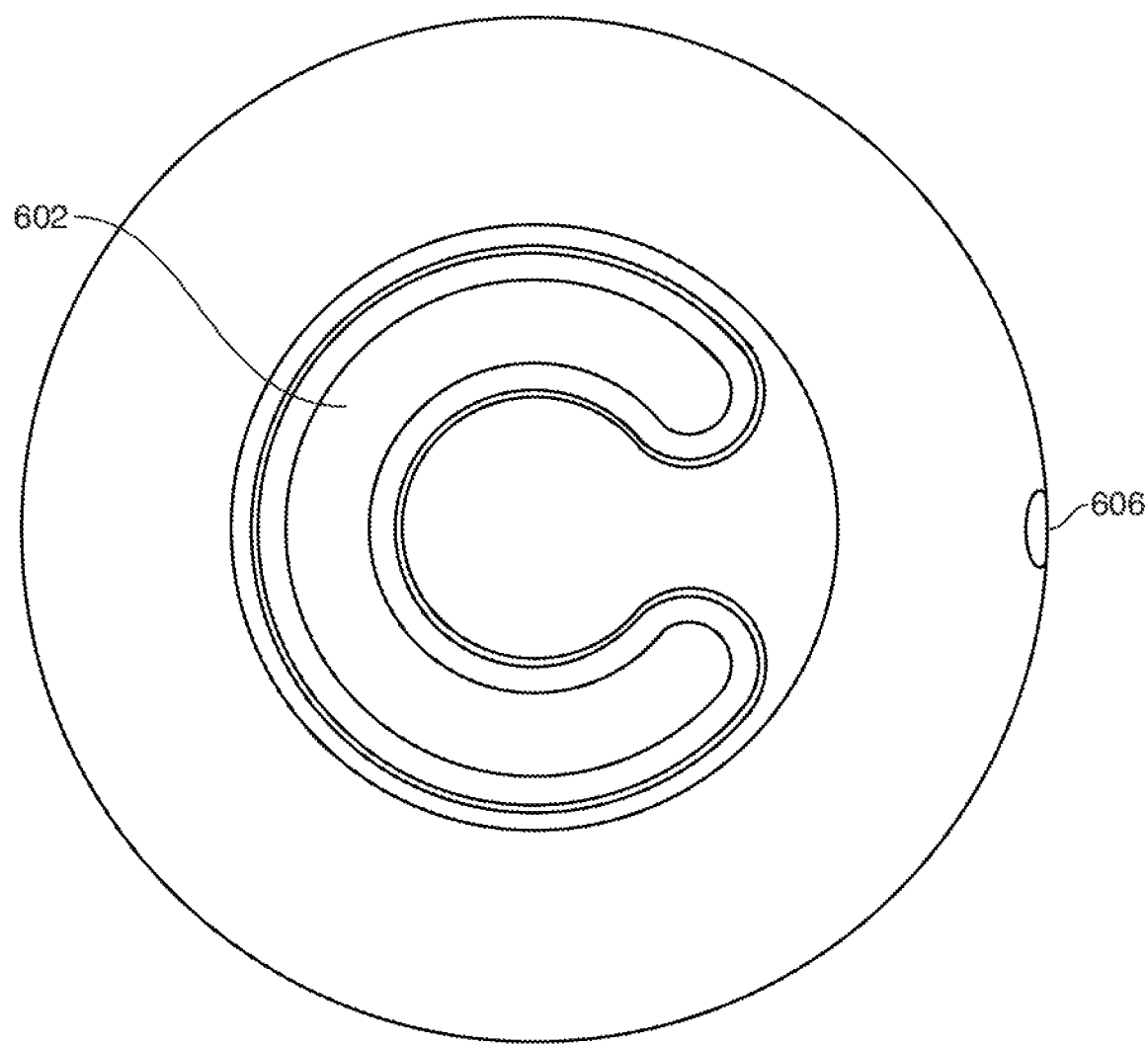
FIG. 7 shows an illustrative top view of embodiments of the disclosure.

FIG. 7 shows an illustrative top view of cover 600. It should be appreciated that connection 606 may connect cover 600 to any suitable connection port, such as connection port 604.

Figure 8:
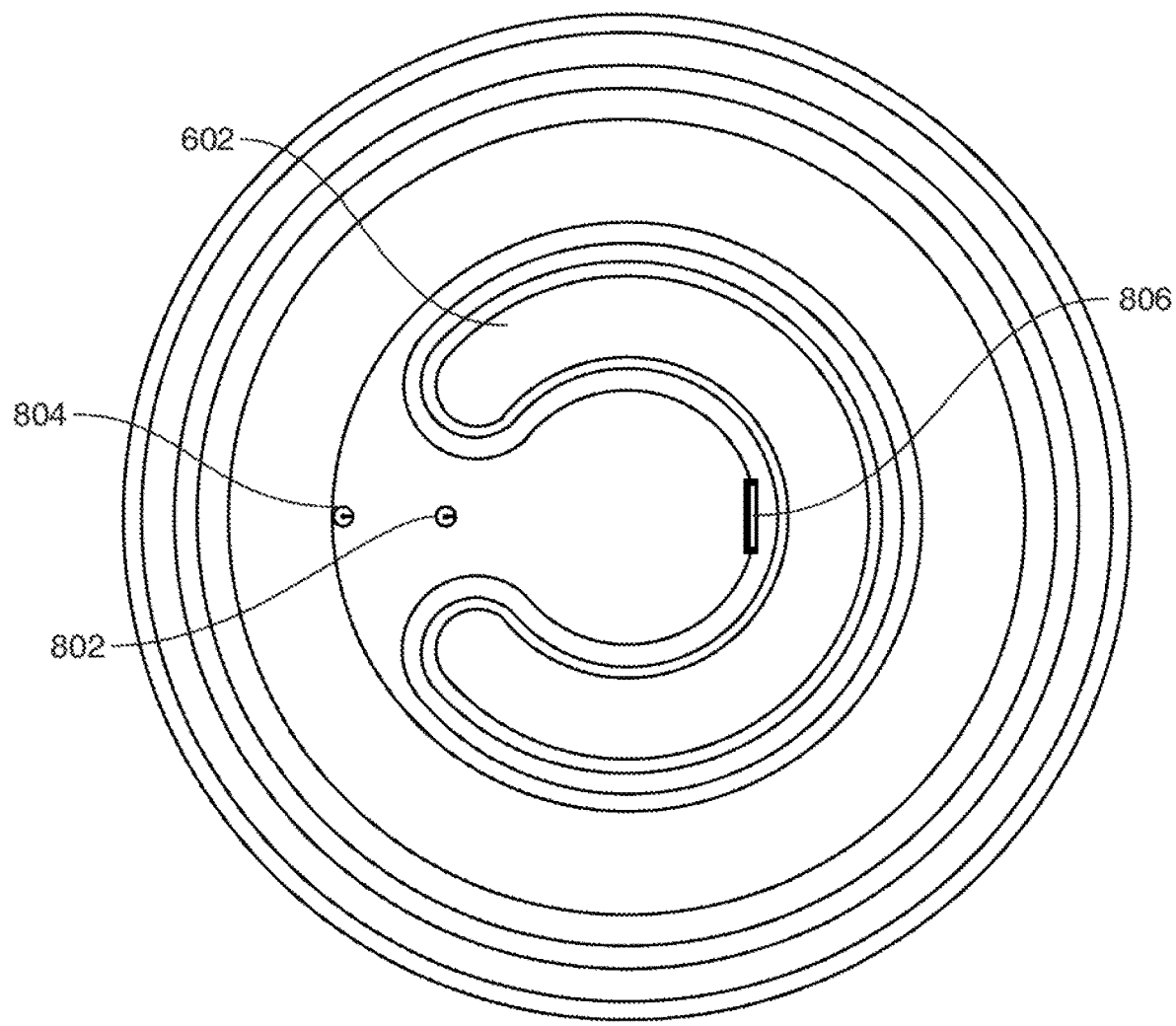
FIG. 8 shows an illustrative bottom view of embodiments of the disclosure.

FIG. 8 shows an illustrative bottom view of cover 600. Bottom view of cover 600 shows charging pins 802 and 804. Charging pins 802 and 804 may be preferably flexible and at least partially depress-able. Charging pin 802 may connect to pole 104 on cap 100. Charging pin 804 may connect to pole 108 on cap 100. It should be appreciated that charging pins 802 and 804 may retract into cover 600, or retract into themselves, when depressed. This depression enables cover 600 to effectively cover shell 114 when charging.

It should be appreciated that cover 600 may include an inner portion and an outer portion. The inner portion may snap into the outer portion using snap 806.

Figure 9:
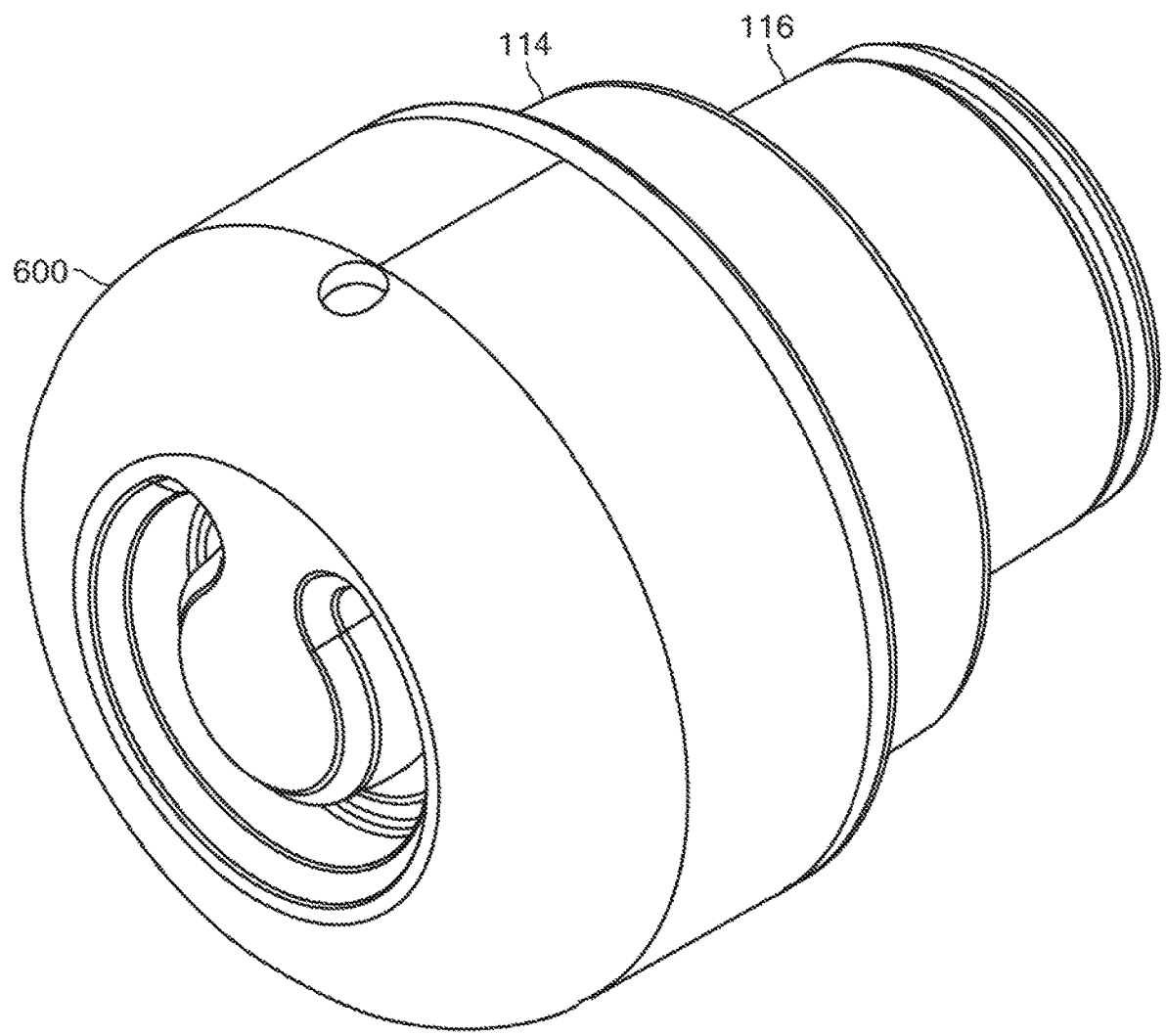
FIG. 9 shows an illustrative prospective view of embodiments of the disclosure.

FIG. 9 shows an illustrative perspective view of cover 600 covering shell 114.

Figure 10:
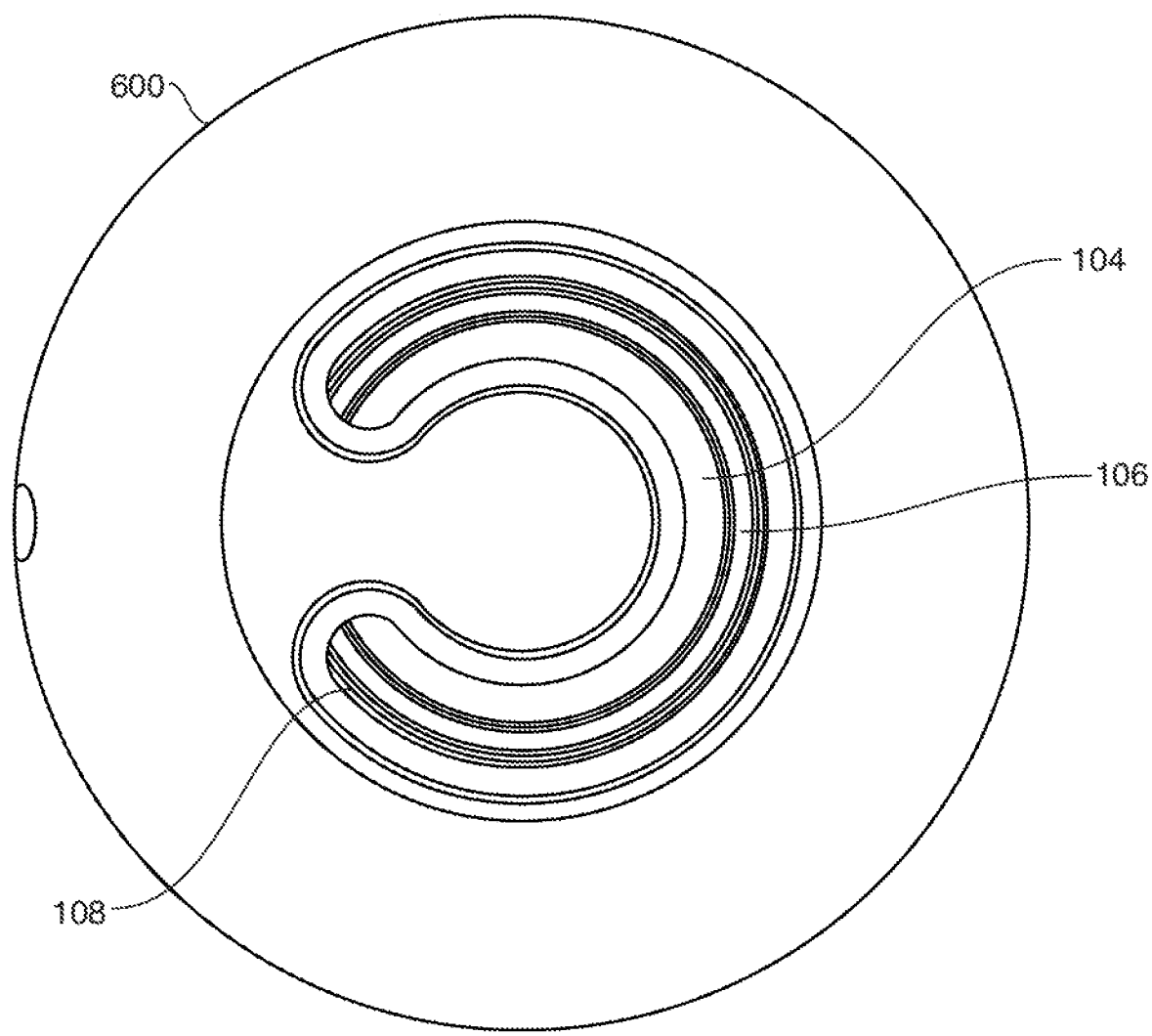
FIG. 10 shows an illustrative top view of embodiments of the disclosure.

FIG. 10 shows an illustrative top view of cover 600 covering shell 114. Through U-shaped hole 602, a portion of pole 104, a portion of pole 108 and RGB ring 106 may be visible.

Figure 11:
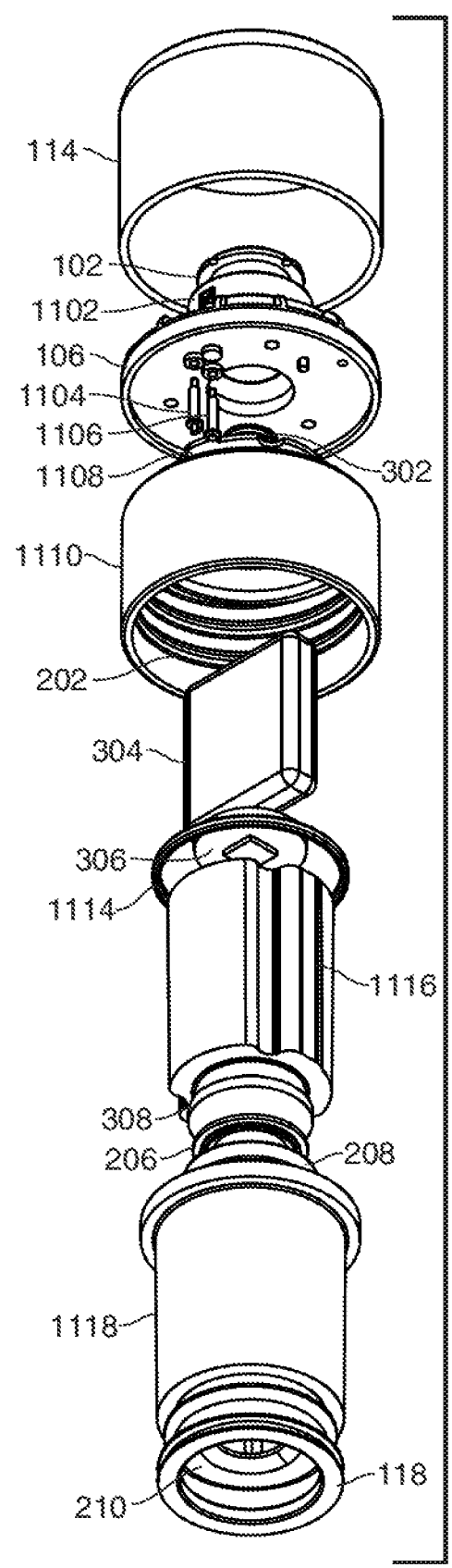
FIG. 11 shows an illustrative exploded view of embodiments of the disclosure.

FIG. 11 shows an exploded view of water purification cap 100. The components shown in water purification cap 100 include shell 114. Touch sensor 102, which may be a touch pad, may be included in shell 114. Ring 1102 may be a charging ring. In some embodiments, ring 1102 may be constructed from metallic material. Ring 1102 may be a positive or negative charging area. Ring 1102 may preferably be a positive charging area.

Shell 114 may be constructed from metallic material. As such, shell 114 may be conductive. Therefore, a portion of shell 114 that is external to RGB ring 106 may be utilized as a positive or negative charging area. The portion of shell 114 that is external to RGB ring 106 may be, preferably, a negative charging area.

RGB ring 106 may be a casing that creates an isolation between positive and negative areas, such as ring 1102 and shell 114.

Charging Pin 1104 may be a charging pin internal to shell 114. Charging pin 1104 may be a positive or negative charging pin. Charging pin 1104 may be preferably a negative charging pin. Charging pin 1104 may form a ground connection with PCB board 1108. Charging pin 1104 may contact outer portion of shell 114. Charging pin 1104 may give negative contact to outer portion of shell 114.

Charging pin 1106 may be a charging pin internal to shell 114. Charging pin 1106 may be a positive or negative charging pin. Charging pin 1106 may be preferably a positive charging pin. Charging pin 1106 may have a positive connection with PCB board 1108.

Spring 302 may be mounted to PCB board 1108. A second LED (not shown) may be mounted onto PCB board 1108. The second LED may be an RGB LED. The RGB LED may illuminate RGB ring 106. Therefore, the top of RGB ring 106 may show the color and/or illumination of RGB LED mounted onto PCB board 1108.

Inner portion of shell 1110 may include inner threads 202. Inner threads 202 may enable cap 100 to screw onto a bottle, such as a reusable water bottle.

Battery 304 may connect, using wires (not shown), to PCB board 1108. Battery 304 may also connect, using wires (not shown) to PCB-A board 306. UV-C LED 204 (not shown) may be mounted on PCB-A board 306. O-ring 1114 may surround PCB-A board 306. O-ring 1114 may be constructed from silicon material. O-ring 1114 may enable the pressure-fit of cap 100. O-ring 1114 may also enable the watertight-ness of the internal components of cap 100.

Internal compartment 1116 may fit into barrel 116. O-ring 308 may surround quartz crystal 206. Shield 208 may protect lower end of barrel 210 from exposure to the UV-C rays.

Casing for barrel 1118 may form a portion of barrel 116. Gasket 118 may surround a lower portion of casing for barrel 1118. Gasket 118 may be constructed from silicon or any other suitable material.

Figure 12:
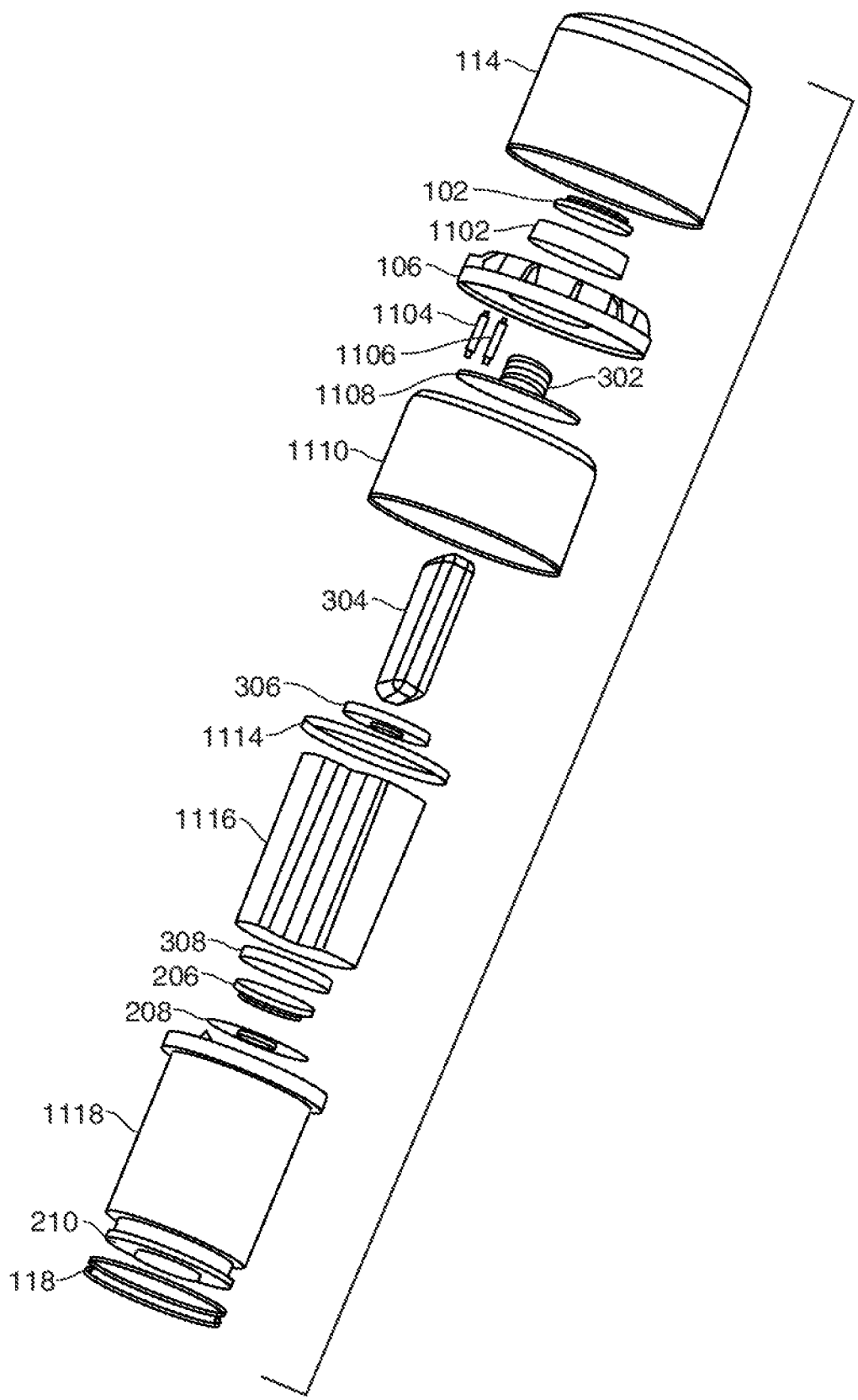
FIG. 12 shows another illustrative exploded view of embodiments of the disclosure.

FIG. 12 shows another exploded view of water purification cap 100.

It should be appreciated that these components may be pressure-fit to one another. As discussed above, it may be preferable for the construction to be glue-less.

Thus, a water purification cap is provided. Persons skilled in the art will appreciate that the present invention can be practiced by other than the described embodiments, which are presented for purposes of illustration rather than of limitation. The present invention is limited only by the claims that follow.

What is claimed is:

1. A water purification cap for covering a water bottle, said cap comprising:
    a barrel;
    a shell, said shell surrounding at least a portion of said barrel;
    a waterproof compartment formed within the interior of the barrel, said waterproof compartment comprising one wall formed at least in part from quartz crystal;
    a light emitting diode ("LED"), said LED:
        fixed within the waterproof compartment;
        proximal to one end of the barrel; and
        oriented to shine light through the quartz crystal; and
    a battery for providing power to the LED;
    wherein the shell comprises a charging site integral to the shell for charging the battery, the charging site comprising a first portion of the shell formed of a conductive material extending along an exterior surface of the shell, a second portion of the shell formed of a conductive material extending along the exterior surface of the shell, and an insulation portion positioned between the first portion and the second portion formed of an insulating material to insulate the first portion from the second portion.

2. The water purification cap of claim 1, wherein the charging site is port-less.

3. The water purification cap of claim 1, wherein the barrel is formed at least partially from plastic.

4. The water purification cap of claim 1, wherein the construction of the cap is a pressure-fit construction.

5. The water purification cap of claim 1, wherein the construction of the cap is glue-less.

6. The water purification cap of claim 1, wherein the shell includes inner threads, and the inner threads enable the cap to screw onto a bottle.

7. The water purification cap of claim 1, wherein the LED light produces ultraviolet light in the range of 275 to 285 nm.

8. A water purification cap for covering a water bottle, said cap comprising:
    a barrel;
    a shell, said shell surrounding a first end of the barrel;
    a charging site integral to the shell, said charging site of the shell comprising:
        a first portion formed of a conductive material extending from an exterior surface of the shell to an interior portion of the shell to form a positive pole;
        a second portion formed of a conductive material extending from the exterior surface of the shell to the interior portion of the shell to form a negative pole; and
        an insulation ring operable to insulate between the positive pole and the negative pole;
    a UV-C ("ultra-violet C") light emitting diode ("LED"), said LED:
        proximal to a second end of the barrel; and
        oriented to shine light from the second end of the barrel; and
    a sensor operable to activate the UV-C LED.

9. The water purification cap of claim 8, further comprising a battery, the battery operable to power the UV-C LED.

10. The water purification cap of claim 9, wherein the insulation ring is a red green blue ("RGB") ring.

11. The water purification cap of claim 10, wherein the sensor is a touch sensor.

12. The water purification cap of claim 11, wherein, upon receipt of a single touch at the touch sensor, the touch sensor activates an indication of battery life on the RGB ring.

13. The water purification cap of claim 11, wherein, upon receipt of a double touch at the touch sensor, the touch sensor activates the UV-C LED.

14. The water purification cap of claim 11, wherein, upon receipt of a multi-touch at the touch sensor, the touch sensor activates the UV-C LED.

15. The water purification cap of claim 13, wherein the UV-C LED is activated for between 90 seconds and 360 seconds.

16. The water purification cap of claim 8, further comprising a stainless-steel shield, said stainless steel shield operable to shield the barrel from light generated by the UV-C LED.

17. The water purification cap of claim 1, further comprising a charger couplable with the cap to charge a battery within the cap, wherein the charger comprises a positive pin and a negative pin, wherein the positive pin is configured to contact the exterior surface of the shell at the first portion and wherein the negative pin is configured to contact the exterior surface of the shell at the second portion to charge the battery when the charger is coupled with the cap.

18. The water purification cap of claim 1, wherein each of the first portion and the second portion of the charging site extend along an exterior surface of the shell to form a ring.

19. The water purification cap of claim 1 further comprising a shield formed from a metallic material configured to inhibit transmission of the light emitted from the LED through the shield, wherein the shield is positioned about the LED such that the shield is operable to shield the barrel from the light generated emitted by the LED.

20. The water purification cap of claim 1 further comprising a sensor that when activated, applies a voltage to the LED to cause the LED to emit light, said sensor being integrated into the shell.

21. The water purification cap of claim 8, wherein the insulation ring is positioned between the positive pole and the negative pole such that the insulation ring is operable to insulate between the positive pole and the negative pole, wherein the insulation ring comprises a second light emitting diode (LED), wherein the second LED is illuminated to indicate a status of the cap.

22. A water purification cap for covering a water bottle, said cap comprising:

a barrel;

a shell, said shell surrounding a first end of the barrel;

an ultraviolet light emitting diode ("LED"), said LED:
  proximal to a second end of the barrel, and
  oriented to shine light from the second end of the barrel;

a battery operable to power the LED;

wherein the shell comprises a charging site integral to the shell including:
  a positive pole formed of a conductive material extending along a first portion of an exterior surface of the shell,
  a negative pole formed of a conductive material extending along a second portion of the exterior surface of the shell, and
  an insulation ring formed of an insulating material positioned between the positive pole and the negative pole to insulate between the positive pole and the negative pole;
  wherein the charging site is couplable with a charger such that a positive pin of the charger is configured to contact the exterior surface of the shell at the positive pole and a negative pin of the charger is configured to contact the exterior surface of the shell at the negative pole to thereby charge the battery.

* * * * *